March 6, 1962 C. J. SEILER 3,024,156
COMPOSITION AND PROCESS FOR THE PRODUCTION OF LAMINATES
Filed Nov. 19, 1958
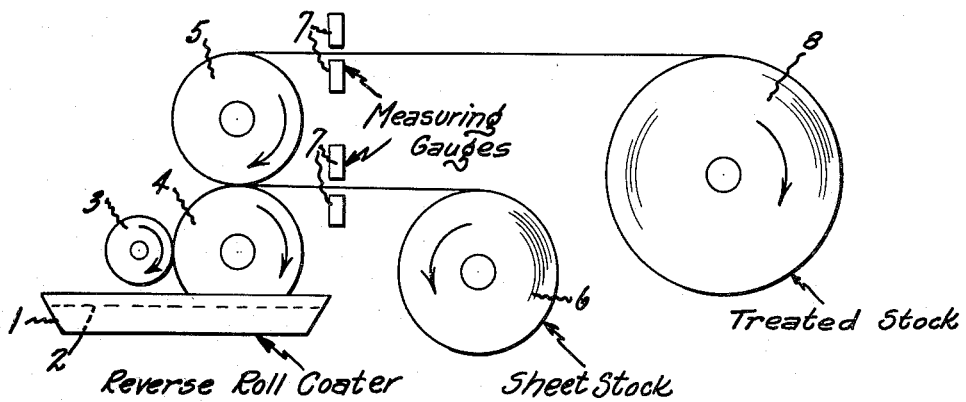
Inventor
Charles J. Seiler
by
His Attorney United States Patent Office 3,024,156
Patented Mar. 6, 1962

3,024,156
COMPOSITION AND PROCESS FOR THE
PRODUCTION OF LAMINATES
Charles J. Seiler, Coshocton, Ohio, assignor to General
Electric Company, a corporation of New York
Filed Nov. 19, 1958, Ser. No. 774,962
7 Claims. (Cl. 156—314)

This invention relates to a composition and process for the production of laminates wherein substantially all polymerization of bonding resin occurs within the sheet material from which the laminate is made. More specifically, this invention relates to a composition and process for the production of laminates in which sheet material is coated with a substantially unreacted and solventless dispersion containing an aromatic compound and a methylene donor, the coated sheet material is then stored to allow for impregnation of the unreacted composition and the sheet material is then formed into a laminate simultaneously with polymerization of the monomeric composition.

Many attempts have heretofore been made to impregnate fibrous material with unreacted resin forming ingredients and to polymerize the ingredients after impregnation by "in situ" techniques. One of the early references to such methods is contained in United States Patent 949,671 which discloses the impregnation of fibrous material with an aqueous solution of phenol and formaldehyde monomers and the subsequent in situ polymerization of the ingredients.

The advantages of in situ polymerization are many. Considerable cost saving results from the elimination of a varnish making step in which a partially polymerzied resin is prepared and then dissolved in a solvent. A solvent is ordinarily necessary to obtain proper penetration of the partially polymerized resin, to control viscosity levels and for other processing requirements. However, the solvents themselves must be removed by volatilization and, in addition to the cost of the solvent, their volatilization requires the use of ovens and oven cycles in the preparation of laminates. Moreover, volatilization of solvent also results in loss by volatilization of resin components.

In spite of the above advantages, in situ methods of impregnation and polymerization have never achieved any commercial importance in the case of the preparation of laminates. There are many reasons for this, primary among which is that the elimination of a varnish making step also eliminates a considerable degree of control over resin polymerization in the subsequent production of the laminate. This results from the fact that the varnish making step must, in effect, be carried out in a single operation while the monomeric composition is impregnated in the sheet material. Moreover, the higher volatility of in situ compositions creates a problem of volatile losses during impregnation and subsequent polymerization. With the elimination of solvent, control of viscosity of the in situ composition is also difficult. Moreover, there are certain difficulties in applying in situ techniques which are unique to phenolic systems. Phenolic resin polymerization requires the use of at least a two-component system—a phenol and an aldehyde—in the presence of a catalyst. If solvent is eliminaed from these monomeric systems, problems of reactivity and compatibility are encountered.

It is thus a primary object of the present invention to provide a substantially solventless thermosetting resin forming composition suitable for the in situ polymerization and preparation of laminates having properties which are the equivalent of laminates produced in accordance with prior techniques.

It is an additional object of this invention to provide a potentially thermosetting composition suitable for the in situ polymerization and preparation of laminates which allows for control of volatility, flow and reactivity during the preparation of laminates.

It is still an additional object of this invention to provide a novel process for the preparation of laminates without the use of costly solvents and without the necessity of conventional oven drying and curing cycles.

Other objects of the invention will appear from the discussion which follows.

The above objects are accomplished by the provision of a resin forming composition suitable for in situ polymerization which comprises a substantially unreacted and solventless dispersion of (1) a monofunctional aromatic compound having an average of more than two reactive nuclear positions and a melting point below 80° C., (2) a solid methylene donor in particulate form selected from the class consisting of paraformaldehyde and hexamethylenetetramine having a particle size from about 1 to 65 microns, the molar ratio of methylene donor to aromatic compound being from about 1 to 2, and (3) from about 40 to 150 percent, by weight of the aromatic compound of a reactivity and flow controller, such as a natural resin wood extract, the dispersion having a pH of about 5.0 to 7.5 and a viscosity of 2,000 to 20,000 centipoises as measured at 32° C.

Thus, the compositions of the present invention are dispersions of a solid methylene donor in a liquid aromatic compound and a flow controller which is soluble in the aromatic compound. As hereinafter used in both the specification and the claims, the term "solventless dispersion" refers to the foregoing dispersion to which an organic solvent, conventionally used in varnish formation, is not added.

The use of a dispersion rather than a solution results in a controlled release of the monomeric constituents of the resin forming compositions, thereby providing for controlled reactivity and cure of the final laminate. Moreover, the use of a dispersion in combination with, for example, a natural wood resin extract has been found to achieve the necessary control of volatility and of viscosity, thereby providing for the elimination of volatile losses and control or flow during processing. The absence of solvent, in addition to avoiding the prior necessity of ovens and oven cycles, also avoids swelling and subsequent blocking of the fibrous sheet material.

The process of this invention is carried out by coating fibrous sheet material with the above unreacted and solventless dispersion and then storing the coated material to allow for impregnation of the monomeric materials into the sheet material. Because no solvent is employed, no costly ovens or time consuming volatilization step is necessary. By simply allowing the sheet material to remain in storage, and preferably in roll form, uniform and complete penetration and distribution of the resin forming composition is permitted. After a storage cycle of varying length, a plurality of the thus impregnated sheets are superimposed. They are then polymerized and bonded simultaneously into a composite laminate.

The accompanying drawing illustrates schematically a preferred process for carrying out the present invention.

THE COMPOSITION

The compositions of this invention contain, as essential ingredients, the substantially unreacted aromatic resin forming monomers and a material which acts as a reactivity and flow controller. In addition, in order to obtain proper control of volatility, flow, reactivity and impregnation in the subsequent laminating procedure, there are certain other critical requirements with respect to the compositions. They must have a pH between about 5.0 and 7.5, and preferably between 5.9 and 6.4. Below about 5.0, it is difficult to obtain proper cure, whereas above 7.5 the reactivity is too great and the pot life is shortened. The viscosity of the compositions should be between about 2,000 and 20,000 cps. and, preferably, from 3,000 to 9,000 cps. In addition, and as previously brought out, it is necessary that the compositions be in dispersion form and that they be substantially solventless. The presence of a solvent will deleteriously affect the properties of the laminate. If later eliminated, prior problems in connection with oven cycles are encountered. The water content, usually added together with the catalyst, should be below about 10% by weight of the total weight of the composition and, preferably, between about 2% to 6%. The significance of the foregoing features will be more clearly brought out in the discussion of the composition and of the impregnation and storage cycle which follows.

The aromatic component of the composition should be a monofunctional aromatic compound or mixture of monofunctional aromatic compounds which are liquid at or near room temperature in the presence of the remaining dissolved constituents of the composition (the remaining dissolved constituents act, of course, to depress the melting point) and which have an average of more than two reactive nuclear positions. A monofunctional aromatic compound is one which contains a single substituted radical on the aromatic ring such as, for example, a hydroxy group. Reactive nuclear positions refer to those positions in the aromatic nucleus which are reactive, e.g., the ortho and para positions on phenol. An average of more than two reactive nuclear positions are necessary to form a thermosetting resin. Among the useful aromatic compounds are those monohydric phenols and mixtures of phenols conventionally used in the preparation of thermosetting phenolic resins and which have the requisite melting point. Best results have been achieved with cresols (mixtures of o, m and p-cresols) and this is the preferred phenolic constituent of the composition. In general, the aromatic compounds, or mixtures of aromatic compounds, should have a melting point below about 80° C. Illustrative aromatic compounds falling within the scope of the invention and which may be used alone or in combination with each other are: phenol, aniline, 3,5-xylenol, 3-tertiary butyl phenol, 3 ethyl phenol, Cardinol (a long chain unsaturated hydrocarbon substituted phenol) and m-toluidine. Each of the foregoing have three or more reactive nuclear positions. Thus they may be used in conjunction with other aromatic compounds having less than three reactive positions as long as the mixture has the necessary average or more than two reactive positions and the required liquid condition at or near room temperature. Illustrative aromatic compounds which may be used in conjunction with the aforementioned are: p-cresol, o-cresol, 2,3-xylenol, 3,4-xylenol, 2-tertiary butyl phenol and 2-hydroxydiphenyl.

The methylene donor must be one which is solid at temperatures below about 80° C., which is generally the highest temperature at which the dispersion will be prepared. In addition, the methylene donor must be essentially organic insoluble under the formulating conditions employed as it must be insoluble in the remaining organic constituents of the composition. A particularly useful compound meeting the foregoing criteria has been found to be paraformaldehyde in proper particle size and this is the preferred methylene donor. An additional methylene donor meeting the foregoing criteria is hexamethylenetetramine. By utilizing the methylene donor as heretofore described, the methylene donor is slowly released during the pressing and curing operation, thus allowing a controlled rate of cure. For this reason it is a critical requirement of the methylene donor component of the composition that it meet with the foregoing requirements with respect to its organic insolubility, its solid state at formulation temperatures and its particle size. The particle size must be small enough to penetrate the fibers of the sheet material which are being treated and yet large enough so that there is no tendency to dissolve in the other components of the in situ composition. The methylene donor should preferably have an average particle size of about 15 to 20 microns with 90% by weight having a particle size less than 60 microns. Broadly stated, the majority of the particles should be between about 1 and 65 microns in size. Particles in excess of 65 microns will not distribute properly in the paper fibers during the storage cycle but tend to filter out on the surface of the paper, creating difficulties during the pressing and curing operation. Because of the solubility of very small particles, their presence in excessive amounts will markedly reduce the pot life of the dispersion and increase the viscosity. Both of the latter will adversely affect the subsequent processing of the laminates. The molar ratio of methylene donor to aromatic compound should be from about 1:1 to 2:1.

As previously stated, the pH of the resin forming composition should be between about 5.0 and 7.5. Catalysts suitable for producing this pH may be of a wide variety of known alkaline condensation catalysts conventionally used in the preparation of one-stage phenolic resins. Useful catalysts include alkali metal and alkaline earth hydroxides, carbonates, silicates and acetates, specifically including sodium hydroxide, potassium hydroxide, barium hydroxide, ammonium hydroxide, calcium acetate, sodium carbonate and sodium silicate. Additional useful catalysts are primary, secondary and tertiary amines such as ethylene diamine, diethylamine, triethylamine and others. A novel catalyst system found to be particularly advantageous is a mixture of an amine such as ammonia or ethylene diamine and a strong alkali or alkaline earth metal base such as sodium or calcium hydroxide in proportions of strong base to amine of about one to 0.5–1.5. Such a catalyst system has been found to achieve optimum control of flow during the laminating operation. The strong base causes a rapid formation of phenolic alcohols or saligenin, while the amine acts in much the same manner as an acidic catalyst to polymerize these phenol alcohols as soon as they are formed. The over-all effect is to reduce the flow during pressing, thereby permitting higher pressure and higher resin contents without bleeding of the mix through the surface of the laminate. The type and amount of catalyst will vary with the specific reactants used. Ordinarily about 1.5 to 7% by weight based upon the weight of the phenolic constituent is employed.

The high molecular weight reactivity and flow controller functions to produce controlled reactivity, controlled volatility and controlled flow. In addition it acts to reduce the hygroscopicity of the phenolic component, thus avoiding the absorption of water from the atmosphere. As a vapor pressure depressant, it acts to reduce the loss of the more volatile components of the composition. To accomplish this, it has been found that the reactivity and flow controller should have a low volatility, specifically less than 200 milligrams per square centimeter per hour at 375° F. The reactivity and flow controller also reduces the reactivity, or conversely increases the stability, of the non-solvated system at lower temperatures. The latter permits the addition of sufficient catalyst to cure the system properly while at the same time providing for adequate pot life during the previous processing steps of the laminating procedure. The compositions of the invention, when prepared in accordance with the teachings of the present specification, will contain less than about 10% dissolved aldehyde or methylene donor and thus effectively prevent substantially all reaction of monomeric resin forming constituents since they will be present in separate and distinct phases. In general materials which are useful in the practice of the present invention as reactivity and flow controllers will include those materials having the following properties: (1) a molecular weight greater than 200, (2) a volatility of less than 200 milligrams per square centimeter per hour in air at 375° F, and (3) substantially complete solubility in, and no reactivity with, the aromatic compound. A preferred reactivity and flow controller is a natural resin extracted from southern pine wood sold under the trade name "Vinsol." Vinsol is a complex mixture of various chemical constituents including acidic materials derived from resin acids and oxidized resin acids, neutral high molecular weight compounds, and acidic phenolic materials in the form of substituted phenolic ethers, polyphenols, and other high molecular weight phenols. Its softening point is about 116° C. Its acid number is 94. It has a methoxyl content 5.3% and has a density at 25° C. of 1.28. Other natural resin wood extracts found to be useful are rosin, the lignocellulose product of hydrolysis of woody materials under elevated pressures and temperatures and lignin. Other useful reactivity and flow controllers are tricresyl phosphate, dibutyl phthalate and mixtures of any of the foregoing with each other or with tung or tall oil. The amount of reactivity and flow controller should be from about 40% to 150% by weight of the weight of the aromatic compound.

It is desirable that a small amount of water be present in the composition in percentages of less than 10% by weight based upon the total weight of the composition. The controlled wetting action of the composition permits distribution of the formulation in the paper during the storage cycle. If too much water is present in the composition, the sheet material will swell at the surface and further penetration will be prevented. The presence of too little water will hinder wetting action and thus prevent distribution and impregnation of the composition into the fibrous sheet material. A water content of 2 to 9% has been found to maintain the optimum wetting balance.

In addition to the foregoing constituents, there may also be added dispersing agents and anti-foam agents although successful compositions may be prepared without the latter additives.

The compositions of the present invention are preferably prepared by adding the reactivity and flow controller to the aromatic compound at a temperature below about 120° C., preferably between 65° and 120° C. In this temperature range, solution is hastened without loss, by volatilization of the aromatic compound. The mixture is then preferably cooled to a lower temperature to avoid solution of the aldehyde, and the aldehyde in particulate form is dispersed in the mix, after which the catalyst is added to adjust the pH. The viscosity at this point will ordinarily be between about 2,000 and 20,000 cps., preferably between about 3,000 and 9,000 cps. and even more preferably between about 6,000 and 9,000 cps. (as measured at 32° C.). As hereinafter referred to in the specifications and claims, viscosity measurements are those taken at 32° C.

THE PROCESS

In general, The process of this invention is carried out by coating sheet material with a composition prepared as set out above, storing the thus coated sheet material to allow for impregnation of the dispersion of monomeric materials into the sheet material and finally laminating and curing at elevated temperatures and pressures. A preferred process for the coating and storage steps is illustrated in the attached drawing which shows schematically, one method of carrying out these steps.

As can be seen in the drawing, the tank 1 contains the resin forming composition 2. Mounted above the tank is a reverse roll coater comprising a metering roll 3 and the two counter-rotating rolls 4 and 5. Metering roll 3 adjusts the amount of composition on roll 4. Lower roll 4 dips, at its lowest extremity, into composition 2 contained in tank 1. Top roll 5 runs in the direction of the sheet stock 6 whereas bottom roll 4, carrying the resin forming composition, runs in an opposite direction from the sheet stock so that the sheet material is coated with a layer of the resin forming composition by reverse roll coating. Suitable measuring gauges 7 can be mounted at stations adjacent the uncoated and coated sheet stock to acurately control the coating weight of the sheet stock. The coating content of the sheet stock will generally be about 30–40% by weight.

From the coating rolls, the now coated sheet stock is led directly to a core where it is wound into a roll 8. In this roll the treated stock is stored for a period of about 24 to 72 or even more hours so that the resin forming composition may thoroughly impregnate the sheet material. Essentially, no cure takes place during this storage cycle. The period of the storage cycle will vary considerably depending, among other factors, upon the viscosity and wettability of the composition and the porosity of the sheet material. Subsequent to the storage cycle, the treated stock may then be unrolled, suitably cut and molded into a composite laminate. The lamination procedure is the same as that used in preparing conventional laminate, except for the use of generally lower laminating pressures. The laminating temperature will ordinarily range from about 130° to 155° C. and the time from about ten to forty minutes. The absence of polymerized resin in the sheet stock permits the use of pressures of 1000 p.s.i. or less in place of the usual 1000–1500 p.s.i. employed heretofore. The process may be carried out at considerably greater speeds than heretofore employed because costly and wasteful curing and drying steps are not necessary. The storage cycle of the present invention does not, of course, require the tie-up of either manpower or equipment.

Any fibrous sheet stock conventionally used in forming industrial or decorative laminate core stocks may be employed in the practice of this invention. Illustrative of such sheet stock are kraft, cotton, rag, alpha and felt paper; synthetic fibrous mats and cloth such as polyester cloth or inorganic sheet material such as asbestos. The uncoated sheet stock will ordinarily contain less than 7% by weight of moisture and preferably not more than about 4%.

The storage cycle need not, of course, take place in roll form, although this method is preferred. The sheet stock may, for example, be cut and stored while flat.

The following examples are given to illustrate the practice of this invention. All parts and percentages are by weight, unless otherwise indicated.

Example 1

To 100 parts of mixed o, m and p-cresols, was added 119 parts of Vinsol at a temperature of 80° C. The Vinsol dissolved readily in the cresol to form a low viscosity liquid system. To this solution was added 50 parts of paraform with strong agitation while the temperature was reduced to about 50° C. The paraform had been previously ground to produce a powder, 95% of whose particles were 50 microns or less in size, which had an average particle size of 15 microns and a minimum particle size of 1 micron. The dispersion was then cooled to about 30° C. and 10.3 parts of a 31% solution of sodium carbonate in water was added. Upon addition of catalyst the pH was raised from about 4 to about 6. The dispersion then had a viscosity at 32° C. of about 7,000 cps.

Example 2

To illustrate the control of reactivity and volatility effected by the use of the pine wood extract, a second formulation was prepared as in Example 1 but omitting the use of Vinsol. The amount of sodium carbonate was reduced to 4.8 parts of 31% solution, but in spite of this reduction, the dispersion was uncontrollably exothermic. A further reduction to 3.2 parts of the same catalyst was used and the dispersion, while still exothermic, could be used if kept at a reduced temperature.

Ten gram samples of the dispersions of Examples 1 and 2 were then placed on a watch glass and exposed to the ambient atmosphere at temperatures of 27° C. and 48° C., respectively. The volatility of the respective compositions was then determined by measuring the weight loss at successive intervals, with the following results:

TABLE A

| Composition of Example 1 containing pine wood extract to control volatility and reactivity | | | | Composition of Example 2 without pine wood extract | | | |
|---|---|---|---|---|---|---|---|
| 27° C. | | 48° C. | | 27° C. | | 48° C. | |
| Time (hrs.) | Percent loss | Time (hrs.) | Percent loss | Time (hrs.) | Percent loss | Time (hrs.) | Percent loss |
| 2.0 | 0.49 | 1.3 | 1.7 | 1.0 | 2.1 | 1.0 | 2.5 |
| 4.5 | 1.14 | 2.5 | 1.8 | 17.0 | 6.75 | 2.0 | 15.1 |
| 20.5 | 1.94 | 3.5 | 3.6 | 23.0 | 11.0 | | |
| 26.5 | 2.30 | | | | | | |

Example 2 and Table A show that a substantially solventless phenolic system is both unstable and highly volatile in the presence of even a small amount of catalyst and that both stability or reactivity as well as volatility may be controlled by the addition of a pine wood extract such as Vinsol.

*Example 3*

A 48 inch width roll of kraft paper was treated with the resin forming composition of Example 1 by reverse roll coating as previously described in connection with the attached drawing. The paper was led through the reverse roll coater at a speed of 300 feet per minute. The resin forming composition was at a temperature of from 25° to 35° C. and the composition was slowly agitated during application of the coating to insure redispersion of composition returned by the metering roll. The treated stock contained about 35% resin forming composition distributed on the paper as a coating.

The treated stock was then rolled on a mandrel to allow for transfer and impregnation of the composition. The roll was then stored for about forty-eight hours at ambient temperatures during which time the formulation penetrated into the paper stock without any measurable advance of the monomeric composition.

The stock was then unrolled and cut into sheets of a size suitable for pressing. There was neither surface powder or excessive tackiness present on the surface of the impregnated sheet stock. The thus cut sheets were then superimposed beneath a layer of conventionally prepared print and overlay papers and molded into a composite decorative laminate at a pressure of 1000 p.s.i., a temperature of 150° C. for about 25 minutes.

The laminate possessed the following properties. For comparative purposes, properties of a decorative laminate prepared in accordance with standard prior art techniques using a prepolymerized phenolic varnish are also given.

| | Example 3 | Standard laminate |
|---|---|---|
| Flexural strength, p.s.i. | 32,000 | 30,000 |
| Moisture absorption, percent | 4.5 | 4.0 |
| Izod impact strength, ft. lbs./in. | .80 | .65 |
| Rockwell hardness, M scale | 105 | 114 |

*Example 4*

The high strength laminate was prepared in accordance with the procedures set out in Examples 1 and 3 from the following formulation:

| | Parts |
|---|---|
| Mixture of meta phenols (cresol, xylenol and ethyl phenol) | 27 |
| Vinsol | 27 |
| Paraform | 11 |
| NaOH (50% water solution) | 2.2 |
| Water | 1.7 |

*Example 5*

This example illustrates the use of a mixed catalyst system comprising sodium hydroxide and ammonia. To 100 parts of mixed o-, m-, and p-cresols were added 119 parts of Vinsol and a solution made by agitation at 80° C. The temperature of the solution was reduced to 50° C. and then 50 parts of finely ground paraform (95% less than 50 microns, average particle size—15 microns, and minimum particle size—1 micron) were added. This dispersion was cooled to 30° C. and to it were added successivly 6.65 parts of 50% aqueous NaOH, 7.5 parts of 28% aqueous ammonia, and 1.98 parts water. This resin forming mixture had a pH of 6.3 and a viscosity of 9200 centipoise at 32° C.

Kraft paper was coated with the above resin forming mixture to produce treated stock with 36% resin. This treated stock was then formed into a laminate in substantially the same manner as set out in Example 3 above.

*Example 6*

To 100 parts of a blend of phenol and cresol were added 119 parts of Vinsol which was dissolved at 80° C. To this clear solution at 50° C. were added 50 parts of a finely ground paraform (particle size as in Example 5). The temperature was reduced to 30° C. and to this dispersion were added 2.54 parts of ethylene diamine and 4.68 parts of water. This resin forming mixture had a pH of 5.3 and a viscosity of 6650 centipoise at 32° C. At elevated temperatures (e.g., 110–155° C.), this mixture cured to an infusible thermoset resin. The resin forming mixture was applied to kraft paper to the extent of 30–40% by weight and the resulting treated stock formed into a laminate as set out above.

*Example 7*

To 100 parts of a blend of phenol and cresol were added 119 parts of Vinsol at a temperature of 80° C. This formed a clear solution of about 5000 centipoise viscosity. To this solution were added 50 parts of a finely ground paraform (particle size as in Example 5) after reducing the temperature to 50° C. The dispersion was cooled at 30° C. and then 5.5 parts of 25% suspension of CaO in water was added. The pH of the mixture after CaO addition was 5.4 and the viscosity at 32° C. was 7400 centipoise. This resin forming mixture was coated on kraft paper and plies of coated paper were converted into a laminate of commercial quality when pressed at elevated temperatures and pressures.

*Example 8*

This example illustrates the use of a mixed catalyst system of calcium oxide and ammonia. To 100 parts of mixed o-, m-, and p-cresols held at 80° C. were added 119 parts of Vinsol and mixed until dissolved. The solution was cooled to 50° C. and to the solution were added 50 parts of finely ground paraform (particle size as in Example 5) to form a uniform dispersion which was then cooled to 30° C.

A mixed catalyst comprised of 1.69 parts CaO, 3.86 parts water, and 3.98 parts 28% aqueous ammonia was added with vigorous stirring. This resin forming mixture had a pH of 5.7 and a viscosity of 13,160 centipoise.

Kraft paper was coated with the above resin forming mixture and formed into a laminate by bonding several plies at elevated temperature and pressure.

Other in situ compositions and laminates were prepared and evaluated using tricresyl phosphate, lignin Indulin A (trade name for a purified pine wood lignin derived from paper-pulp sulfate black liquor), Transphalt 100 (trade name for a dark thermoplastic hydrocarbon resin having a softening point of about 100° C.) and rosin as the reactivity and flow controller. All were found to produce laminates with satisfactory processing and product properties.

The composition and process of the present invention are useful for the preparation of core stock for both decorative and industrial laminates. Either or both outer surface laminae may be made by conventional resin impregnation methods. For example, with decorative laminates the top surface will ordinarily be a melamine resin impregnated sheet. With industrial laminates, both outer laminae may be impregnated with a prepolymerized phenolic, polyester or other laminating resin. Printed circuits with outer copper laminae may also be prepared from core stock prepared in accordance with the present invention.

What I claim as new and desire to secure by Letters Patent of the United States is:

1. A process for the production of laminates by impregnation and in situ polymerization comprising (1) coating fibrous sheet material with a substantially unreacted and solventless dispersion of (a) a monohydric phenol having an average of more than two reactive nuclear positions and a melting point below about 80° C., (b) a solid methylene donor in particulate form selected from the class consisting of paraformaldehyde and hexamethylenetetramine, said methylene donor having a particle size from about 1 to 65 microns, the molar ratio of methylene donor to phenol being from 1 to 2, and (c) a natural resin extracted from wood in an amount from about 40 to 150 percent, by weight of the phenol, said dispersion having a pH of about 5.0 to 7.5 and a viscosity of about 2,000 to 20,000 centipoises, (2) winding the coated materials into a roll and storing the roll for a time and at a temperature under which essentially no polymerization takes place to allow for impregnation of the dispersion into the sheet material, (3) unrolling the impregnated sheet material, (4) superimposing a plurality of the impregnated sheets, and (5) simultaneously polymerizing and laminating, with heat and pressure, the impregnated sheets into a composite laminate.

2. The process of claim 1 in which the natural resin wood extract has a softening point of about 116° C., and acid number of 94, a methoxyl content of 5.3 percent and a density at 25° C. of 1.28.

3. The process of claim 1 in which the phenol is cresol.

4. The process of claim 1 in which the methylene donor is paraformaldehyde.

5. The process of claim 1 in which the pH of the dispersion is adjusted with a mixture comprising an amine and a strong base selected from the group consisting of alkali and alkaline earth metal bases in the ratio of 0.5–1.5 to one of amine to strong base.

6. A process for the production of laminates by impregnation and in situ polymerization comprising (1) coating fibrous sheet material with a substantially unreacted and solventless dispersion of (a) cresol, (b) paraformaldehyde in particulate form having a particle size from about 1 to 65 microns, the molar ratio of paraformaldehyde to cresol being from 1 to 2, (c) a natural resin extracted from wood, which has a softening point of about 116° C., an acid number of 94, a methoxyl content of 5.3 percent, and a density at 25° C. of 1.28, in an amount from about 40 to 150 percent, by weight of the cresol, and (d) from about 2 to 9 percent by total weight of the dispersion of water, said dispersion having a pH of about 5.0 to 7.5 and a viscosity of about 2,000 to 20,000 centipoises, (2) winding the coated materials into a roll and storing the roll for a time and at a temperature under which essentially no polymerization takes place to allow for impregnation of the dispersion into the sheet material, (3) unrolling the impregnated sheet material, (4) superimposing a plurality of the impregnated sheets, and (5) simultaneously polymerizing and laminating, with heat and pressure, the impregnated sheets into a composite laminate.

7. A process for the production of laminates by impregnation and in situ polymerization comprising (1) coating fibrous sheet material with a substantially unreacted and solventless dispersion of (a) a monohydric phenol having an average of more than 2 reactive nuclear positions and a melting point below 80° C., (b) a solid methylene donor in particulate form selected from the class consisting of paraformaldehyde and hexamethylenetetramine, said methylene donor having a particle size from about 1 to 65 microns, the molar ratio of methylene donor to phenol being from 1 to 2, and (c) a flow controller in an amount from about 40 to 150 percent, by weight of the phenol, comprising a natural resin extracted from wood, said dispersion having a pH from about 5.0 to 7.5 and a viscosity of about 2,000 to 20,000 centipoises, (2) storing the coated sheet material for a time and at a temperature under which essentially no polymerization takes place to allow for impregnation of the dispersion into the sheet material, (3) superimposing a plurality of the impregnated sheets, and (4) simultaneously polymerizing and laminating, with heat and pressure, the impregnated sheets into a composite laminate.

References Cited in the file of this patent

UNITED STATES PATENTS

| 1,613,894 | Kessler | Jan. 11, 1927 |
| 2,153,660 | Clapp | Apr. 11, 1939 |
| 2,260,187 | Miller | Oct. 21, 1941 |
| 2,309,090 | Bauer | Jan. 26, 1943 |
| 2,324,758 | Bowden | July 20, 1943 |
| 2,357,091 | D'Alelio | Aug. 29, 1944 |
| 2,441,860 | Whetstone | May 18, 1948 |
| 2,746,898 | Buckwalter et al. | May 22, 1956 |
| 2,758,101 | Shappell | Aug. 7, 1956 |

OTHER REFERENCES

"Chemistry of Commercial Plastics," by R. L. Wakeman, published in 1947 by Reinhold Publishing Corp, N.Y., pages 115–125.